N. LEWSEN.
TIRE RIM EXPANDING JACK.
APPLICATION FILED SEPT. 10, 1917. RENEWED MAR. 19, 1920.

1,353,765. Patented Sept. 21, 1920.

Inventor:
Nicolaus Lewsen
by S. W. Bates Atty.

UNITED STATES PATENT OFFICE.

NICOLAUS LEWSEN, OF PORTLAND, MAINE.

TIRE-RIM-EXPANDING JACK.

1,353,765. Specification of Letters Patent. Patented Sept. 21, 1920.

Application filed September 10, 1917, Serial No. 190,168. Renewed March 19, 1920. Serial No. 367,126.

*To all whom it may concern:*

Be it known that I, NICOLAUS LEWSEN, a citizen of the United States, residing at Portland, in the county of Cumberland and State of Maine, have invented certain new and useful Improvements in Tire-Rim-Expanding Jacks, of which the following is a specification.

My invention relates to a jack for expanding the rims of pneumatic tires when putting them into position on the inside of the tire.

The class of rims to which my invention applies are those slightly flexible rims the ends of which abut to make the rim complete.

In these rims when they are to be removed, they are slightly collapsed to contract their diameters so that they may be forced from the tire. When they are assembled with the tire it is necessary to expand the rim so that the ends will slide by each other and so snap into place.

Much force is necessary to expand the rim under these circumstances and my invention has for its object to produce an expanding jack for this purpose which will be efficient for doing this work and which may be manufactured at a low price.

The jack is designed so that it can be made of standard parts which may be bought on the open market and does not have to be specially manufactured. As I prefer to construct it, it consists of a central hub which has a section cut from a pipe of relatively large size with three lateral openings through it and three radial arms all of which are made extensible.

Two of these arms are composed of screw threaded rods each having a nut near each of its ends. The inner end of each rod extends loosely through the hub opening with a bearing against the nut, the outer end connecting with a bearing member.

The third arm is of the same construction except that it is cut in two and united by a turn buckle by which the strain is put on the rim to expand it.

My invention may be best understood by means of the accompanying drawing in which—

Figure 1:
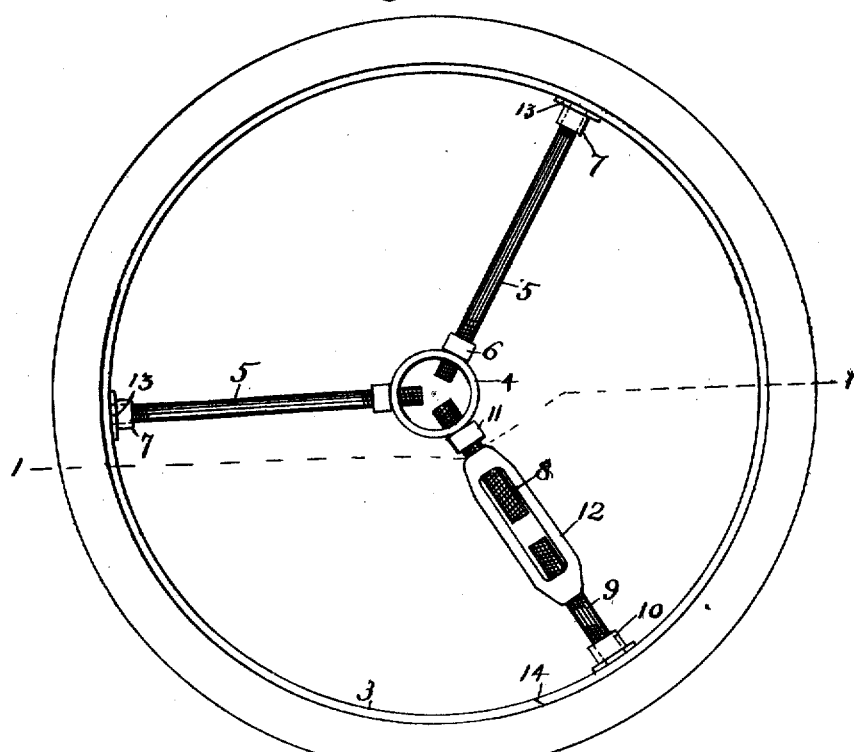
Figure 1 is a plan.
Figure 2:
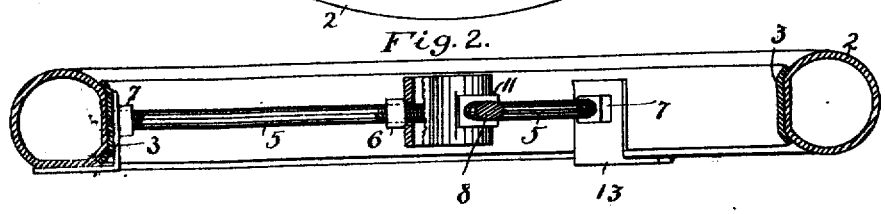
Fig. 2 is a section on the line 1—1 except a small portion at the hub which is taken on the center to show a detail. 2 represents the tire and 3 the rim. The jack is made up of a central hub with three arms.

As shown, the hub 4 is annular with three lateral holes spaced at equal distance around the hub. Two of the radial arms are made up of rods 5 each having screw threads cut in from the ends a sufficient distance. Near each inner end is a nut 6 and near each outer end a nut 7. The nut 6 is located far enough from the end of the rod so that the end of the rod projects through into the interior of the hub and the bearing comes on the inner surface of the nut.

The opening in the hub is somewhat larger than the rod so there may be more or less pivoted motion between the hub and the arm. On the outer end of each arm the bolt is screwed into an opening in the bearing member 13 which is an angle iron bearing against the rim and extending along the side of the tire.

The third arm is made up of two rods 8 and 9 similar to the rods 5 but shorter. They are united by a turn buckle 12. A nut 11 is screwed on the rod 8 near its inner end and has a bearing on the hub and a nut 10 is screwed on the outer end of the rod 9.

The operation of the device is as follows:—

The jack is placed in position and expanded as far as possible by hand the turn buckle arm being sufficiently shortened for this purpose. The turn buckle is now turned to extend the arm and a continuous outward pressure is thus exerted on three points of the rim about equally spaced about the rim.

One of the arms is preferably placed near the joint 14 where the ends of the rim come together and by pressing the rim outward at two other points spaced equally at each side of the turn buckle arm the rim slides easily into place.

Great power may be exerted by the turn buckle which may be turned by a rod or any similar device. It will be seen that the jack will readily come apart making four pieces which may be compactly stored.

By adjusting the lengths of the effective portions of the arms by the inner nuts, the jack may be adjusted to rims of different diameter.

I claim:—

1. A tire rim expanding jack, comprising a central annular hub having three lateral openings spaced apart at substantially equal distances, radial arms having threaded inner end portions detachably fitted in and loosely engaging said openings to permit lateral swinging movement, nuts arranged on the said threaded portions of the arms and bearing against the central hub whereby the said arms are radially adjustable, one of said arms being in two parts and having a connecting turn buckle, and means carried by the outer ends of the arms for engaging a rim.

2. A tire rim expanding jack, comprising a central annular hub member having three lateral openings, radial arms consisting of threaded bolts having their inner ends detachably fitted in and loosely engaging the lateral openings of the hub, inner nuts arranged on the said arms and bearing against the outside of the hub to secure the arms in radial adjustment, outer nuts arranged on the outer ends of the said arms, and bearing members threaded on the outer ends of the arms and engaged by the outer nuts and adapted to fit against a rim, one of said arms being in two parts and provided with a connecting turn buckle.

In testimony whereof I affix my signature.

NICOLAUS LEWSEN.